(12) United States Patent
Moroda

(10) Patent No.: US 11,716,245 B2
(45) Date of Patent: Aug. 1, 2023

(54) INFORMATION PROCESSING APPARATUS FOR PREVENTING A STATE WHERE OPERATION FOLLOWING A RULE SET IN THE INFORMATION PROCESSING APPARATUS IS NOT PERFORMED

(71) Applicant: CANON KABUSHIKI KAISHA, Tokyo (JP)

(72) Inventor: Hajime Moroda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/477,145

(22) Filed: Sep. 16, 2021

(65) Prior Publication Data

US 2022/0094595 A1 Mar. 24, 2022

(30) Foreign Application Priority Data

Sep. 23, 2020 (JP) ................................. 2020-158798

(51) Int. Cl.
| | |
|---|---|
| *H04L 41/0806* | (2022.01) |
| *H04L 41/0873* | (2022.01) |
| *H04L 67/01* | (2022.01) |
| *H04L 43/0817* | (2022.01) |
| *H04L 9/40* | (2022.01) |
| *H04L 43/045* | (2022.01) |

(52) U.S. Cl.
CPC ...... *H04L 41/0806* (2013.01); *H04L 41/0873* (2013.01); *H04L 67/01* (2022.05)

(58) Field of Classification Search
CPC ........... H04L 41/0806; H04L 41/08073; H04L 67/01; H04L 43/0817; H04L 43/20; H04L 43/045

See application file for complete search history.

(56) References Cited

U.S. PATENT DOCUMENTS

| | | | | |
|---|---|---|---|---|
| 8,364,919 B2 * | 1/2013 | Sano | ....................... | G06F 12/16 |
| | | | | 711/162 |
| 8,938,470 B1 * | 1/2015 | Kumbhari | ............... | H04L 45/02 |
| | | | | 707/769 |
| 9,853,862 B2 * | 12/2017 | Ranbro | ............... | H04L 41/0886 |

(Continued)

FOREIGN PATENT DOCUMENTS

| | | | |
|---|---|---|---|
| EP | 3073726 A1 * | 9/2016 | ......... H04L 41/0846 |
| JP | 2007199958 A | 8/2007 | |
| JP | 2015226324 A | 12/2015 | |

*Primary Examiner* — Alina A Boutah
(74) *Attorney, Agent, or Firm* — Canon U.S.A., Inc., IP Division

(57) ABSTRACT

An information processing apparatus includes a storage unit configured to store setting that associates a node number assigned to a first external device with a first command transmittable and receivable to/from the first external device, a determination unit configured to determine, in a case where the first command is not transmittable and receivable to/from a second external device that takes over the node number of the first external device, whether a second command compatible with the first command is transmittable and receivable to/from the second external device, and a control unit configured to perform, in a case where the determination unit determines that the second command is transmittable and receivable to/from the second external device, control to change the first command in the setting to the second command.

11 Claims, 12 Drawing Sheets

(56) References Cited

U.S. PATENT DOCUMENTS

| | | | |
|---|---|---|---|
| 2008/0126628 A1* | 5/2008 | Mullis | G06F 9/4411 710/63 |
| 2013/0021885 A1* | 1/2013 | Jeong | G11B 20/10 |
| 2019/0258532 A1* | 8/2019 | Tokuchi | H04L 67/54 |
| 2020/0245196 A1* | 7/2020 | Iwata | H04W 36/0077 |
| 2020/0389590 A1* | 12/2020 | Moroda | H04N 5/23218 |
| 2020/0404010 A1* | 12/2020 | Costante | H04L 63/20 |

* cited by examiner

FIG.3

| FIRST COMMAND | SECOND COMMAND |
|---|---|
| Command Class: Notification<br>Command Name: Notification Report<br>Notification Type = Home Security<br>Notification Name = Intrusion | Command Class: Notification<br>Command Name: Notification Report<br>Notification Type = Home Security<br>Notification Name = Motion detection |
| Command Class: Notification<br>Command Name: Notification Report<br>Notification Type = Smoke Alarm<br>Notification Name = Smoke detected | Command Class: Notification<br>Command Name: Notification Report<br>Notification Type = CO Alarm<br>Notification Name = Carbon monoxide detected |
| Command Class: Battery<br>Command Name: Battery Report<br>Replace/recharge status bitmask = now | Command Class: Notification<br>Command Name: Notification Report<br>Notification Type = Power Management<br>Notification Name = Replace battery now |
| . . . | . . . |

FIG.5

```
                    RULE SETTING #1
    EVENT
      NODE
      NUMBER    [ 6 ▽ ]
      RECEIVED
      COMMAND   [ Intrusion           ▽ ]   } 211
    ACTION
      [ Send e-mail                   ▽ ]   } 212

[ SAVE ] ~213      [ CANCEL ] ~214
```

FIG.6

FOLLOWING SETTING CANNOT BE USED IN NEW DEVICE.

RULE SETTING #1

EVENT
 NODE NUMBER 6
 Notification Report: Home Security - Intrusion

FOLLOWING SIMILAR SETTING CAN BE USED.
DO YOU WANT TO CHANGE SETTING?

RULE SETTING #1

EVENT
 NODE NUMBER 6
 Notification Report: Home Security - Motion detection

YES        NO

FIG.10

RULE SETTING #2

TRIGGER EVENT
- Time 08:00am  } 241

ACTION
- NODE NUMBER: 7
- RECEIVED COMMAND: Binary Switch Set 0xFF  } 242

SAVE ~243    CANCEL ~244

FIG.11

FOLLOWING SETTING CANNOT BE USED IN NEW DEVICE. 251

RULE SETTING #2

ACTION
 NODE NUMBER 7
 Binary Switch Set 0xFF

FOLLOWING SIMILAR SETTING CAN BE USED.
DO YOU WANT TO CHANGE SETTING? 252

RULE SETTING #2

ACTION
 NODE NUMBER 7
 Basic Set 0xFF

YES — 253     NO — 254

INFORMATION PROCESSING APPARATUS FOR PREVENTING A STATE WHERE OPERATION FOLLOWING A RULE SET IN THE INFORMATION PROCESSING APPARATUS IS NOT PERFORMED

BACKGROUND

Field of the Disclosure

The present disclosure relates to an information processing apparatus, an information processing method, and a storage medium.

Description of the Related Art

A monitoring apparatus that can be controlled by remote operation through a network or a dedicated line is known. This kind of monitoring apparatus is configured to also perform monitoring using an external device in addition to monitoring by a camera, etc. provided in the own apparatus. The external device includes a detection device detecting a state, such as a passive infrared ray (MR) sensor or a gas sensor. Further, operation devices that operate a motor and an electric circuit in response to contents of an instruction from outside, such as a smart plug and a door lock are also included in the external devices. The monitoring apparatus is an information processing apparatus, and performs monitoring using the external device by transmitting and receiving commands to/from the external device. The commands include a command transmitted from the external device to the monitoring apparatus and a command transmitted from the monitoring apparatus to the external device. The former command is used to notify the monitoring apparatus of a state detected by the external device, and is hereinafter referred to as a "notification command". The latter command is used to control the external device by the monitoring apparatus, and is hereinafter referred to as a "control command".

The monitoring apparatus is required to constantly automatically operate without manpower. Therefore, a rule in which an event and an action are associated with each other is previously set to the monitoring apparatus. The event includes arrival of a set time, reception of the notification command from the external device, etc. The action includes, in addition to operation of the monitoring apparatus itself (start of recording, transmission of e-mail, etc.), transmission of the control command to a specific external device. Communication between the monitoring apparatus and the external device is performed by using a mesh network such as Z-Wave, and specification of the external device within the rule is performed based on a node number. When the rule is once set to the monitoring apparatus, the monitoring apparatus can be automatically operated. Further, when the external device is replaced because of failure, the node number assigned to the external device before replacement is assigned to the external device after replacement, which makes it possible to continue automatic operation of the monitoring apparatus without resetting the rule.

Japanese Patent Application Laid-Open No. 2007-199958 discusses a multifunctional peripheral that is configured to easily update, in a case where a personal computer (PC) connected to a network is replaced, identification information on a replacement source PC set in an address hook with identification information on a replacement destination PC. Japanese Patent Application Laid-Open No. 2015-226324 discusses a technique that determines a new camera as a camera for replacement for a specific camera in a case where a camera connected to a network is replaced, and configures the new camera based on configuration setting of the specific camera.

In a case where the external device connected to the monitoring apparatus is replaced, however, the external device may be replaced not with the external device exactly same as the external device before replacement but with an external device of a different product having similar functions. In this case, the external device after replacement may not support the commands set in the rule for the external device before replacement, and operation following the rule may not be performed due to replacement of the external device. Therefore, to replace the external device with an external device of a different product, it is necessary to check command supporting state, and to reset the rule, as necessary. However, replacement of the external device is not always performed by experts. Therefore, the external device is left without resetting the rule even though the resetting of the rule is necessary, which may result in a state where operation following the rule is not performed.

SUMMARY

The present disclosure is made in consideration of such issues, and the present disclosure is directed to a technique to prevent, in a case where an external device connected to an information processing apparatus is replaced, occurrence of a state where operation following a rule set in the information processing apparatus is not performed. According to an aspect of the present disclosure, an information processing apparatus includes a storage unit configured to store setting that associates a node number assigned to a first external device with a first command transmittable and receivable to/from the first external device, a determination unit configured to determine, in a case where the first command is not transmittable and receivable to/from a second external device that takes over the node number of the first external device, whether a second command compatible with the first command is transmittable and receivable to/from the second external device, and a control unit configured to perform, in a case where the determination unit determines that the second command is transmittable and receivable to/from the second external device, control to change the first command in the setting to the second command.

Further features of the present disclosure will become apparent from the following description of exemplary embodiments with reference to the attached drawings.

BRIEF DESCRIPTION OF THE DRAWINGS

FIG. 3 is a diagram illustrating a command correspondence table previously stored in a storage unit.

FIG. 5 is a diagram illustrating a display screen for rule setting, displayed on a client apparatus in step S102 illustrated in FIG. 4.

FIG. 6 is a diagram illustrating a display screen displayed on the client apparatus having received notification in step S109 illustrated in FIG. 1.

FIG. 10 is a diagram illustrating a display screen for Wile setting, displayed on the client apparatus in step S203 illustrated in FIG. 8.

FIG. 11 is a diagram illustrating a display screen displayed on the client apparatus having received notification in step S211 illustrated in FIG. 9.

DESCRIPTION OF THE EMBODIMENTS

Some exemplary embodiments of the present disclosure are described in detail below with reference to accompanying drawings. The exemplary embodiments described below are implementation examples of the present disclosure. The exemplary embodiments described below should be appropriately corrected or modified depending on a configuration of an apparatus to which the present disclosure is applied and various kinds of conditions, and the present disclosure is not limited to the following exemplary embodiments. Further, all of combinations of features described in the exemplary embodiments are not necessarily essential for solving means of the present disclosure.

Figure 1:
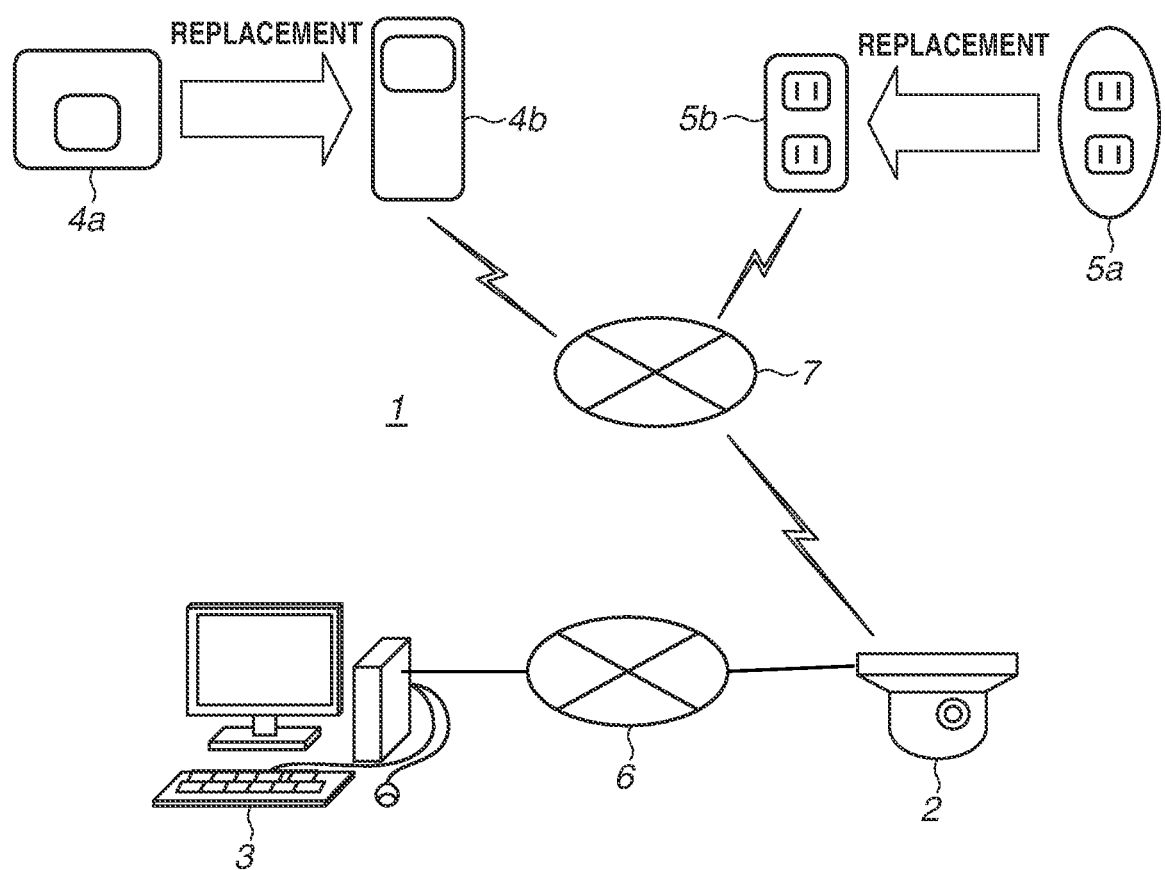
FIG. 1 is a diagram illustrating an example of a configuration of a monitoring system according to one or more aspects of the present disclosure.

FIG. 1 is a diagram illustrating an example of a configuration of a monitoring system 1 according to a first exemplary embodiment of the present disclosure. As illustrated in FIG. 1, the monitoring system 1 includes a monitoring apparatus 2, a client apparatus 3, a detection device 4b, and an operation device 5b. Among them, the detection device 4b has been replaced from a detection device 4a previously used. The operation device 5b has been replaced from an operation device 5a previously used. F 1 illustrates a state where the detection device 4a has been replaced with the detection device 4b and the operation device 5a has been replaced with the operation device 5b. In the present exemplary embodiment, a configuration to prevent, in the case where the detection device 4a is replaced with the detection device 4b, occurrence of a state where operation following a rule set in the monitoring apparatus 2 is not performed with respect to the above-described notification command, is described. The case where the operation device 5a is replaced with the operation device 5b is described in a second exemplary embodiment described below.

The monitoring apparatus 2 is an information processing apparatus (computer) having a function as, for example, a network camera, and is connected to the client apparatus 3 through a wired or wireless network 6. The monitoring apparatus 2 is also connected to the detection device 4b (or detection device 4a) and the operation device 5b (or operation device 5a) through a wired or wireless network 7. The monitoring apparatus 2 monitors a state (i.e., receives notification command) of the detection device 4b (or detection device 4a), and instructs operation (i.e., transmit control command) to the operation device 5b (or operation device 5a) through the connection. In the following, description is continued by regarding the monitoring apparatus 2 as the computer having the function as the network camera. The network 6 includes a plurality of routers, switches, and cables complying with various kinds of communication standards such as Ethernet®. However, the communication standard, a scale, and a configuration of the network 6 are not particularly limited as long as the network 6 enables communication between the monitoring apparatus 2 and the client apparatus 3.

As the network 7, for example, a network complying with various kinds of communication standards such as Z-Wave, Zigbee®, Bluetooth®, other wireless personal area network (PAN), and wireless local area network (LAN), is usable. However, the communication standard, a scale, and a configuration of the network 7 are not particularly limited as long as the network 7 enables communication between the monitoring apparatus 2 and the detection device 4a or 4b and communication between the monitoring apparatus 2 and the operation device 5a or 5b. In the following, description is continued on the premise that the network 7 is configured by Z-Wave. In this case, when an external device is connected, the monitoring apparatus 2 first assigns a node number as a management number to the connected external device, and memorizes the external device as a device on the network 7. Further, the monitoring apparatus 2 monitors and controls each external device while specifying the external device by using the node number. In a case where the external device having the assigned node number is replaced with a new device, the monitoring apparatus 2 can continuously use the node number associated with the external device before replacement, for the external device after replacement. The detail thereof is described below.

Each of the detection devices 4a and 4b is a device including a sensor such as a passive infrared ray (PIR) sensor or a gas sensor. Each of the detection devices 4a and 4b is configured to detect a surrounding state by the sensor, and to transmit information representing a result of the detection by a notification command. Each of the detection devices 4a and 4b has a similar state detection function (sensor). Each of the operation devices 5a and 5b is a device including a mechanism that includes a motor or an electric circuit, for example, a smart plug or a door lock. Each of the operation devices 5a and 5b is configured to operate the motor or the electric circuit in response to a control command received from outside. Each of the operation devices 5a and 5b has a similar operation function.

The client apparatus 3 is an information processing apparatus such as a personal computer (PC), and has a role to control operation of the monitoring apparatus 2. The client apparatus 3 includes a display unit, and also fitnctions as a display control apparatus controlling the display unit. The client apparatus 3 transmits various kinds of control information to the monitoring apparatus 2. The monitoring apparatus 2 having received the control information performs operation based on the received control information, and returns a response against the control information to the client apparatus 3.

The control information transmitted from the client apparatus 3 to the monitoring apparatus 2 includes information to set a rule to the monitoring apparatus 2. The rule associates a predetermined action of the monitoring apparatus 2 with an event occurring in the monitoring apparatus 2. The monitoring apparatus 2 having received the information performs rule setting based on the received information. The information transmitted from the monitoring apparatus 2 to the client apparatus 3 includes information including contents to be displayed on the display unit of the client apparatus 3. The information includes information to ask whether to be able to change the rule and information representing that a part of the rule is invalid. The detail of the information is described in detail below with reference to FIG. 4 to FIG. 7.

The monitoring apparatus 2 is configured to receive the notification command representing the detected state from the detection device 4a or 4b, and to transmit the control command to instruct operation contents to the operation device 5a or 5b. A frame of each command includes a command class name, a command name, and one or more pieces of command data different for each command, and contents represented by the command are specified by a combination thereof. In a case where the monitoring apparatus 2 has received the notification command from the detection device 4a or 4b, the monitoring apparatus 2 performs an action following the set rule, and notifies the client apparatus 3 of the state represented by the notification command. The action performed following the set rule may include transmission of the control command to the operation device 5a or 5b. In a case where the monitoring apparatus 2 has received an operation instruction by a user from the client apparatus 3, the monitoring apparatus 2 may also transmit the control command to the operation device 5a or 5b.

An intrusion detection command described below is an example of the notification command. The intrusion detection command is a command transmitted in a case where the detection device including the PIR sensor detects an intruder passing in front of the detection device, and includes the following flame configuration.
Intrusion Detection Command
Command. Class: Notification
Command Name: Notification Report
Command Data 1: Notification Type=Home Security
Command Data 2: Notification Name=Intrusion The command class Notification is a command class including a series of commands used to notify an event or a state such as detection of motion, opening/closing of a door, or system failure. The command name "Notification Report" represents that the intrusion detection command is a kind of command to transmit the state detected by the detection device. Each of the detection devices 4a and 4b is configured to transmit the intrusion detection command in response to a request from the monitoring apparatus 2 or autonomously. The command data "Notification Type" and "Notification Name" is an argument of the intrusion detection command. The command data "Notification Type" set to "Home Security" represents that the notification relates to home security. Further, the command data "Notification Name" set to "Intrusion" represents that intrusion has been detected. The actual intrusion detection command may include some pieces of command data in addition to the above-described command data.

A switch-on command described below is an example of the control command. The switch-on command is a command to turn on a smart plug, and includes the following frame configuration.
Switch-On Command
Command Class: Binary Switch
Command Name: Binary Switch Set
Command Data 1: Target Value=0xFF The command class "Binary Switch" is a command class including a series of commands used to control an on/off state of the operation device. The command name "Binary Switch Set" represents that the switch-on command (switch-off command) is a kind of command to set an on (off) state of the operation device. The command data "Target Value" is an argument of the switch-on command (switch-off command), and a value 0x00 represents setting to the off state, and a value other than 0x00 represents setting to the on state. As a specific value of each of the command class name, the command name, and some pieces of command data, the above-described character string data may be used or a previously defined identification number (e.g., 0x07 for Home Security) may be used.

Each of the monitoring apparatus 2, the detection devices 4a and 4b, and the operation devices 5a and 5b can transmit and receive one or more commands as described above. Further, each of the monitoring apparatus 2, the detection devices 4a and 4b, and the operation devices 5a and 5b transmits and receives a control command to establish, maintain, or end the mutual communication, as necessary. A plurality of detection devices or a plurality of operation devices may be provided on the network 7. Each of the monitoring apparatus 2, the detection devices 4a and 4b, and the operation devices 5a and 5b has a product identification number. The product identification number is an inherent identification number determined for each product, and devices of the same type each has the same number. As an example, the product identification number may be defined as a combination of a plurality of identification numbers such as a manufacturer identification number representing a manufacturer, a product type identification number determined by the manufacturer, and a product identification number determined by the manufacturer.

Figure 2:
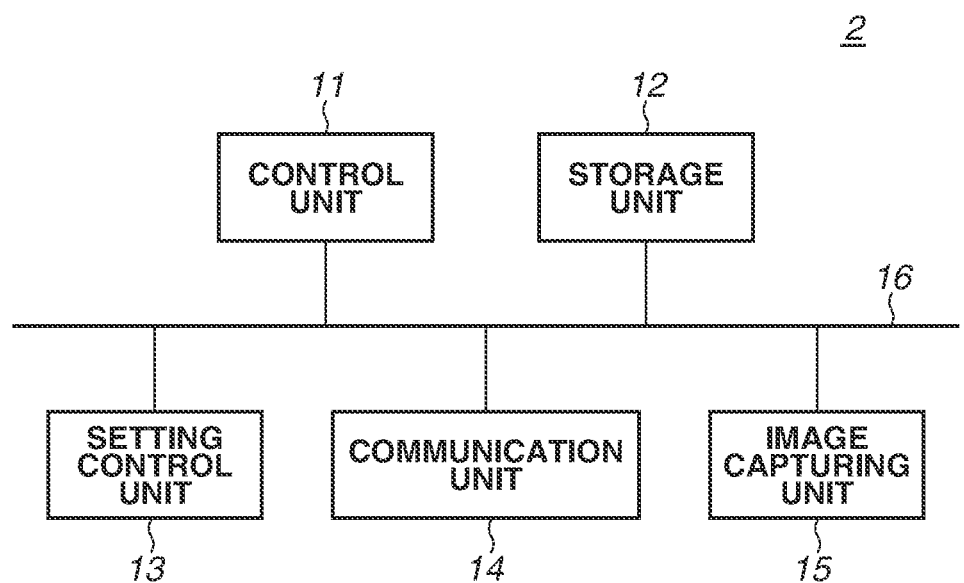
FIG. 2 is a diagram illustrating a configuration of a monitoring apparatus.

FIG. 2 is a diagram illustrating a configuration of the monitoring apparatus 2. As illustrated in FIG. 2, the monitoring apparatus 2 includes a control unit 11, a storage unit 12, a setting control unit 13, a communication unit 14, and an image capturing unit 15. These units are connected through a bus 16. The control unit 11 is, for example, a central processing unit (CPU), and has a function to control the whole of the monitoring apparatus 2. The storage unit 12 includes a storage device including a main storage device and an auxiliary storage device, and stores various kinds of data. More specifically, the storage unit 12 is used as a storage area of programs to be executed by the control unit 11, the setting control unit 13, or other units, and as a work area during execution of the programs. Further, the storage unit 12 is also used as a storage area for various kinds of data such as setting information on rule setting used by the setting control unit 13, and a command correspondence table described below.

The setting control unit 13 is a functional unit that controls setting relating to the notification command received from the detection device 4a or 4b, setting relating to the control command transmitted to the operation device 5a or 5b, etc. The above-described rule is one of the settings. In the rule setting, the setting control unit 13 can set reception of the notification command from the detection device 4a or 4b as an event, and can set transmission of the control command to the operation device 5a or 5b as an action. However, the event and the action set in the rule are not limited to transmission and reception of the commands. The rule set by the setting control unit 13 is stored in a format of a setting file in the storage unit 12. The setting control unit 13 refers to the rule and updates the rule through the setting file as needed. The communication unit 14 performs communication with the detection device 4a or 4b and the operation device 5a or 5b through the network 7. The above-described various kinds of commands (notification command representing state, control command instructing operation, and other commands necessary for communication) are transmitted and received between the monitoring apparatus 2 and the detection device 4a, or 4b or between the monitoring apparatus 2 and the operation device 5a or 5b through the communication. The communication unit 14 also communicates with the client apparatus 3 through the network 6. The above-described control information and the above-described information including contents to be displayed on the display unit of the client apparatus 3 are transmitted and received between the monitoring apparatus 2 and the client apparatus 3 through the communication.

The image capturing unit 15 is a functional unit capturing a still mage or a moving image under the control of the control unit 11. The control unit 11 may control the image capturing unit 15 to capture a still image or a moving image constantly or periodically, or may cause the image capturing unit 15 to start image capturing as one of actions set in the rule. The still image or the moving image captured by the image capturing unit 15 is stored in the storage unit 12. FIG. 3 is a diagram illustrating the command correspondence table previously stored in the storage unit 12. The table is to associate notification commands having compatibility, and a group of a first command and a second command having mutual compatibility is stored in each row.

For example, in a first row, the above-described intrusion detection command is stored as the first command, and a motion detection command described below is stored as the second command. The motion detection command is different from the intrusion detection command in that contents of the command data "Notification Name" is "Motion Detection" in the motion detection command.

Motion Detection Command
Command Class: Notification
Command Name: Notification Report
Command Data 1: Notification Type=Home Security
Command Data 2: Notification Name=Motion detection In a second row, a smoke detection command and a carbon monoxide detection command described below are respectively stored as the first command and the second command.

Smoke Detection Command
Command Class: Notification
Command Name: Notification Report
Command Data 1: Notification Type=Smoke Alarm
Command Data 2: Notification Name Smoke detected
Carbon Monoxide Detection Command
Command Class: Notification
Command Name: Notification Report
Command Data 1: Notification Type=CO Alarm
Command Data 2: Notification Name=Carbon monoxide detected In a third row, a charge state notification command and a low remaining battery level notification command described below are respectively stored as the first command and the second command.

Charge State Notification Command
Command Class: Battery
Command Name: Battery Report
Command Data 1: Replace/recharge status bitmask=now
Low Remaining Battery Level Notification Command
Command Class: Notification
Command Name: Notification Report
Command Data 1: Notification Type=Power Management
Command Data 2: Notification Name=Replace battery now Each of the groups collectively includes commands similar in representing contents and use method, or similar commands. For example, as for the intrusion detection command and the motion detection command in the first row, in a case where the detection device as the PIR sensor has detected a moving object passing in front of the detection device, it is difficult to determine whether the moving object is an intruder. Therefore, both of the intrusion detection command and the motion detection command may be used depending on the type of the detection device. The charge state notification command and the low remaining battery level notification command in the third row both represent that replacement of a battery is necessary now, even though the command classes are different from each other. In the command correspondence table in FIG. 3, only two commands are defined in each of the groups; however, one group may include three or more commands. Further, a certain command and the other command are not always substitutable for each other. Therefore, the command correspondence table may have a format other than the format in the example illustrated in FIG. 3, and a specific format of the command correspondence table is not limited. For example, the command correspondence table may be configured by a table in a format in which a command to be changed in setting is put in a first column, and one or more commands substitutable for the command in the first column are put in and after a second column.

Figure 4:
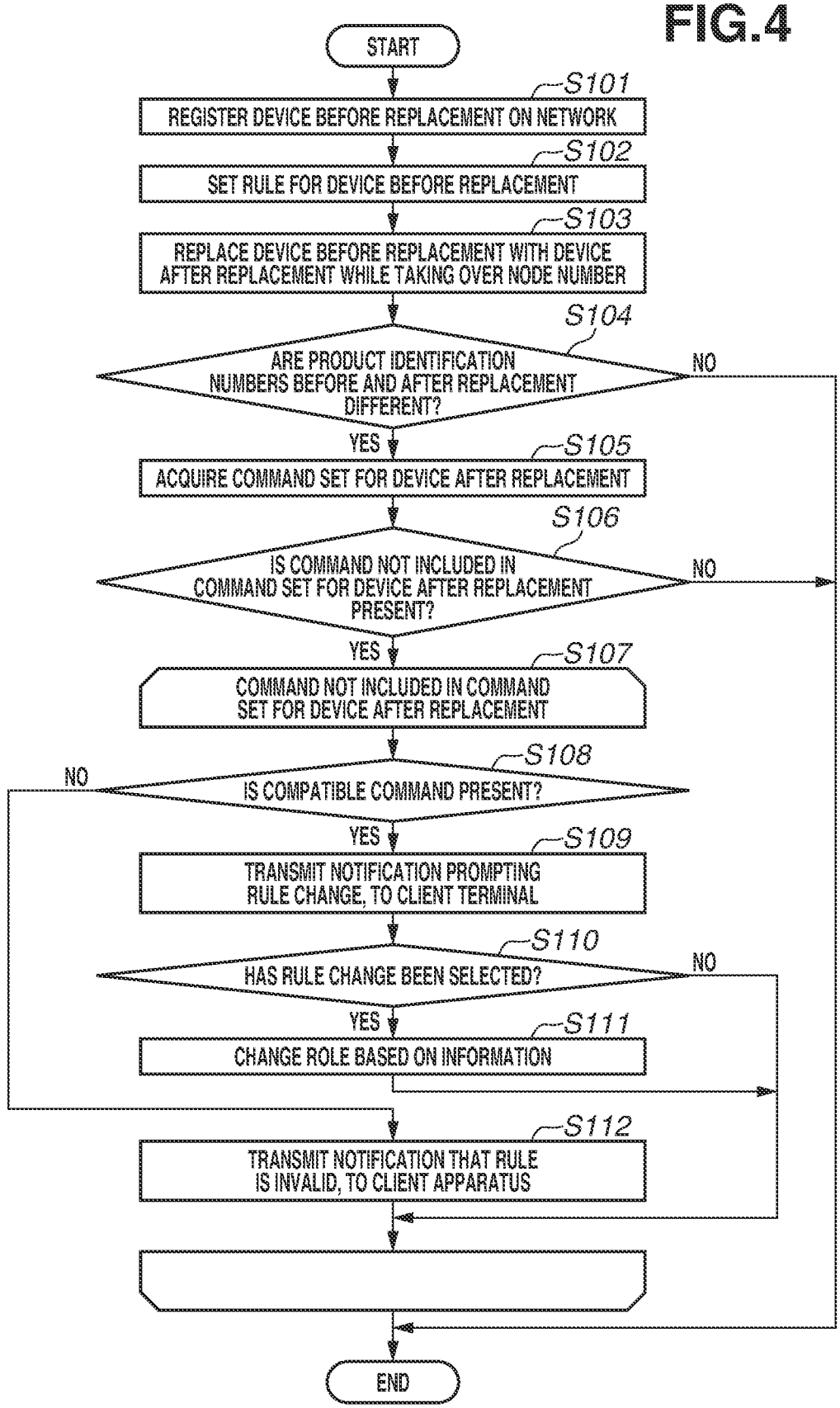
FIG. 4 is a flowchart illustrating processing by the monitoring apparatus according to one or more aspects of the present disclosure.

Further, the commands collected as a group in the command correspondence table are not necessarily necessary to be usable as commands substitutable for each other. Whether a certain command can be substituted by the other command in the group is finally determined by the user based on the functions of the external device and usage by the user (steps S109 to S111 in FIG. 4 described below). FIG. 4 is a flowchart illustrating processing by the monitoring apparatus 2 according to the present exemplary embodiment. The processing illustrated in FIG. 4 is realized when the control unit 11 and the setting control unit 13 of the monitoring apparatus 2 execute programs stored in the storage unit 12. In the following, the processing by the monitoring apparatus 2 in the case where the detection device 4a is replaced with the detection device 4b is described in detail with reference to FIG. 4 and FIGS. 5 to 8 described below.

First, in step S101, the control unit 11 performs processing to register the detection device 4a that is a device before replacement, on the network 7. More specifically, the control unit 11 transmits and receives a command to exchange various kinds of information necessary to register the detection device 4a as a device on the network 7, to/from the detection device 4a through the communication unit 14. The various kinds of necessary information include basic information to control the detection device 4a, such as information on commands usable for the detection device 4a, information to encrypt a communication path, setting information on an operation time of the detection device 4a, the node number, and the product identification number. The control unit 11 stores the information acquired in step S101 in the storage unit 12. As a result, registration of the detection device 4a is completed. In the following, description is continued by regarding the node number of the detection device 4a as "6".

Next, in step S102, the setting control unit 13 receives contents of a rule to be set regarding the detection device 4a, from the client apparatus 3, and performs processing to set the rule in the storage unit 12, In a case where an event occurs, the control unit 11 thereafter performs the designated action based on the rule thus stored in the storage unit 12. FIG. 5 is a diagram illustrating a display screen 21 for rule setting, displayed on the client apparatus 3 in step S102. The display screen 21 is displayed when a control unit of the client apparatus 3 executes a program stored in a storage unit of the client apparatus 3 in response to user input of a rule setting request to the client apparatus 3. The client apparatus 3 transmits contents of the rule set by the user in the display screen 21, to the monitoring apparatus 2.

The display screen 21 is a screen displayed for setting of one of a plurality of rules settable to the monitoring apparatus 2. The display screen 21 in the example of FIG. 5 is a screen for setting of a rule identified by an identification number ill. The display screen 21 includes a selection list 211 to set an event serving as a trigger for execution of an action, and a selection list 212 to set an action to be performed when the event occurs. Further, a save button 213 to save the setting and a cancel button 214 to cancel the setting are displayed on the display screen 21, Options of each of the selection lists 211 and 212 may be provided by the setting control unit 13 of the monitoring apparatus 2. In this case, the setting control unit 13 transmits the options of each of the selection lists 211 and 212 to the client apparatus 3 through the communication unit 14, based on information on events and actions usable in the monitoring apparatus 2. In the present exemplary embodiment, the selection list 211 includes options of the node number representing a command transmission source. As necessary, a selection list to designate, for example, parameter information on an event or an action, schedule information, and an action at the end of an event in a case where the event is a persistent event, may be displayed on the display screen 21.

The user performs selection of each of the lists in the display screen 21 by operating the client apparatus 3. In the example of FIG. 5, in the selection list 211, reception of the above-described intrusion detection command (Intrusion) from a device having a node number 6 on the network 7 has been selected. Further, in the selection list 212, transmission of a mail (Send e-mail) has been selected. The type of action selectable in the selection list 212 is not particularly limited as long as the action can be performed by the monitoring apparatus 2. For example, storing of a movie, an image, sound, etc. acquired by the image capturing unit 15 in the storage unit 12, an external storage device (not illustrated), or other storages may be set as an action. When the user presses the save button 213, the information on the rule setting is saved in the storage unit of the client apparatus 3 by the control unit of the client apparatus 3. In contrast, when the user presses the cancel button 214, the save is not performed, and the setting is canceled. The control unit of the client apparatus 3 transmits the information on the rule setting saved in the storage unit to the monitoring apparatus 2. The setting control unit 13 of the monitoring apparatus 2 receives the information through the communication unit 11, generates a rule based on the received information on the rule setting, and stores the generated rule as, for example, a setting file in the storage unit 12.

Referring back to FIG. 4, in step S103, processing to replace the detection device 4a with the detection device 4b is performed. More specifically, the detection device 4a is first replaced with the detection device 4b by the user. The control unit 11 then detects that the detection device 4a has become unresponsive. Further, the detection device 4b transmits information to notify that the detection device 4b operates in a mode to participate in the network, to surrounding devices. The user operates a device operation screen (not illustrated) of the client apparatus 3, and transmits a control instruction to incorporate the new device in the network 7 by reusing the same node number "6", to the monitoring apparatus 2. Thereafter, the control unit 11 transmits a command to perform the control instruction to the detection device 4b through the communication unit 14. Alternatively, the control unit 11 may transmit the command to perform the control instruction to the detection device 4b at a stage when the control unit 11 detects that the detection device 4a has become unresponsive and that the detection device 4b operates in the mode to participate in the network. Thereafter, the control unit 11 transmits and receives the command to exchange various kinds of information necessary to register the detection device 4b as a device having the node number "6" on the network 7, to/from the detection device 4b having received the command to perform the control instruction. The various kinds of necessary information include the node number, information necessary to establish communication such as information to encrypt a communication path, and the product identification number. The control unit 11 may further transmit and receive information on the detection device 4b itself to/from the detection device 4b. The detection device 4a may be in a state of not returning a communication response, or the control unit 11 and the detection device 4a may communicate with each other as necessary. The control unit 11 stores the information acquired in step S103 in the storage unit 12. As a result, registration of the detection device 4b is completed. Next, in step S104, the control unit 11 compares the product identification number of the detection device 4a and the product identification number of the detection device 4b stored in the storage unit 12. In a case where the product identification number of the detection device 4a and the product identification number of the detection device 4b are different from each other (YES in step S104), the processing proceeds to step S105, Otherwise (NO in step S104), the processing to register the detection device 4b is completed without performing processing in and after step S105.

In step S105, the control unit 11 transmits and receives, to/from the detection device 4b, a command to exchange information on commands that can be transmitted and received to/from the detection device 4b, thereby acquiring a command set representing the commands that can be transmitted and received to/from the detection device 4b. The control unit 11 stores the acquired information on the command set in the storage unit 12. The control unit 11 may acquire the information on the command set from the detection device 4b in step S103. Next, in step S106, the setting control unit 13 refers to the rule (set in step S102) stored in the storage unit 12, and determines whether each of one or more notification commands set to events for the node number "6" is included in the above-described command set. In a case where it is determined that a command not included in the above-described command set is present (YES in step S106), the setting control unit 13 performs processing in steps S108 to S112 on each of the one or more commands not included in the above-described command set in step S107. In contrast, in a case where it is determined that a command not included in the above-described command set is not present (NO in step S106), the processing to register the detection device 4b is completed without performing processing in and after step S107.

In step S108, the setting control unit 13 determines whether a command compatible with a command to be processed is present, by referring to the command correspondence table illustrated in FIG. 3. For example, in a case where the command to be processed is the intrusion detection command, the motion detection command is the compatible command because the intrusion detection command and the motion detection command belong to the same group in the table of FIG. 3. In a case where the compatible command is present (YES in step S108), the processing proceeds to step S109. Otherwise (NO in step S108), the processing proceeds to step S112. In step S109, the setting control unit 13 transmits notification prompting rule change (information to ask execution/non-execution of rule change) to the client apparatus 3.

FIG. 6 is a diagram illustrating a display screen 22 displayed on the client apparatus 3 having received the notification in step S109. The display screen 22 is displayed when the control unit of the client apparatus 3 having received the notification in step S109 executes a program stored in the storage unit of the client apparatus 3. FIG. 6 illustrates a case where the event of the rule setting #1 illustrated in FIG. 5 is a change object, and the motion detection command is presented as a substitution rule. The display screen 22 includes a display area 221 to notify a rule unusable in the device after replacement, and a display area 222 to notify a substitution rule compatible with the unusable rule. A button 223 to determine to change the unusable rule to the substitution rule and a button 224 to determine not to change the setting are further displayed on the display screen 22.

The user checks contents of the display area 221 and the display area 222 by viewing the display screen 22 displayed on the display unit of the client apparatus 3. Thereafter, the user determines whether to change the unusable rule to the substitution rule, and operates the client apparatus 3 based on a result of the determination. More specifically, to change the unusable rule to the substitution rule, the user presses the button 223. In contrast, not to change the unusable rule to the substitution rule, the user presses the button 224. In a case where the button 223 is pressed, the control unit of the client apparatus 3 transmits information representing that the current setting is changed to the substitution rule, to the monitoring apparatus 2 through the network 6. In contrast, in a case where the button 224 is pressed, the control unit of the client apparatus 3 transmits information representing that the current setting is not changed to the substitution rule, to the monitoring apparatus 2 through the network 6. In a case where there is a plurality of options to be changed in setting, the display screen 22 may display all of the options to cause the user to select the option.

Referring back to FIG. 4, in step S110, the setting control unit 13 receives the information transmitted by the client apparatus 3 through the communication unit 14, and checks the contents to determine whether the user has selected a change of the unusable rule to the substitution rule. In a case where it is determined that the user has selected the rule change (YES in step S110), the processing proceeds to step S111. In step S111, the setting control unit 13 changes the rule in the storage unit 12 based on the substitution rule. The processing then proceeds to a next command. In contrast, in a case where it is determined that the user has not selected the rule change (NO in step S110), the processing proceeds to a next command without performing processing in step S111, When the processing proceeds from step S108 to step S112, the setting control unit 13 transmits notification that the rule is invalid, to the client apparatus 3. The processing then proceeds to a next command.

Figure 7:
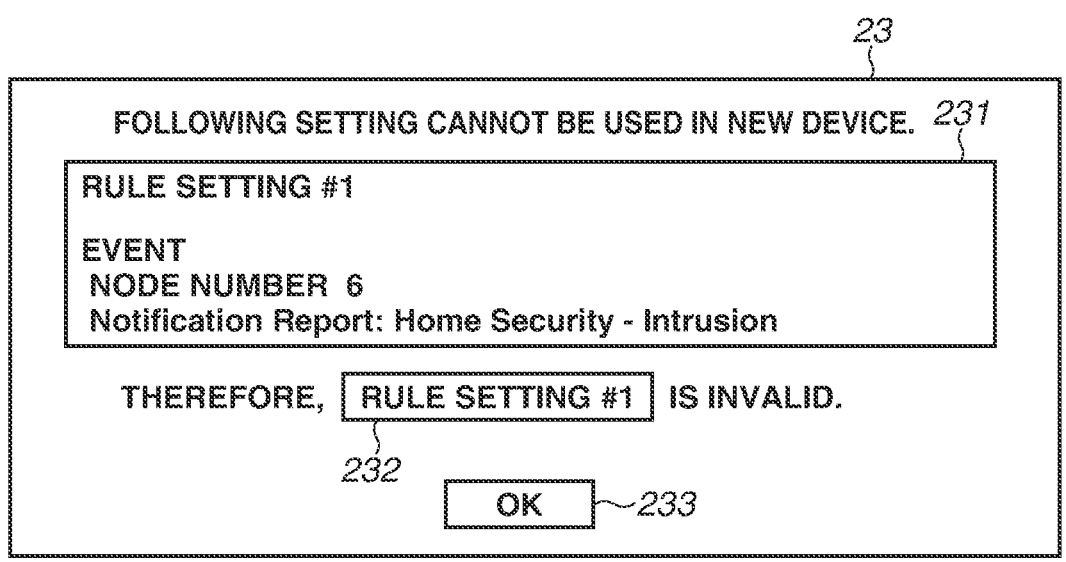
FIG. 7 is a diagram illustrating a display screen displayed on the client apparatus having received notification in step S112 illustrated in FIG. 4.

FIG. 7 is a diagram illustrating a display screen 23 displayed on the client apparatus 3 having received the notification in step S112. The display screen 23 is displayed when the control unit of the client apparatus 3 having received the notification in step S112 executes a program stored in the storage unit of the client apparatus 3. FIG. 7 illustrates a case where the rule setting #1 illustrated in FIG. 5 is invalid. The display screen 23 includes a display area 231 to notify the rule unusable in the device after replacement, and a display area 232 to specify the invalid rule. Further, a button 233 to close the display screen 23 after the notification is checked is displayed on the display screen 23. The user checks the invalid rule by viewing the display screen 23 displayed on the display unit of the client apparatus 3, and closes the display screen 23 by pressing the button 233.

As described above, according to the present exemplary embodiment, the monitoring apparatus 2 checks whether the detection device 4a and the detection device 4h are the same product when the detection device 4a is replaced with the detection device 4b. In a case where the detection device 4a and the detection device 4b are not the same product, the monitoring apparatus 2 checks whether the notification command set to the event of the rule stored in the storage unit 12 can be received from the detection device 4b. Thereafter, in a case where the notification command set to the event of the rule cannot be received from the detection device 4b but the compatible notification command can be received from the detection device 4b, the monitoring apparatus 2 transmits the notification prompting the rule change to the user. When the user selects the rule change, the monitoring apparatus 2 changes the rule. Accordingly, in the case where the detection device 4a is replaced with the detection device 4b, it is possible to prevent occurrence of a state where operation following the rule set in the monitoring apparatus 2 is not performed.

In the present exemplary embodiment, the example in which the display screen 22 is displayed for each of the rules has been described; however, a screen prompting selection for each of the plurality of rule settings may be displayed on one display screen 22. Likewise, in the above-described exemplary embodiment, the example in which the display screen 23 is displayed for each of the rules has been described; however, information about each of the plurality of rule settings may be displayed in one display screen 23.

In a second exemplary embodiment of the present disclosure, a configuration to prevent occurrence of a state where operation following the rule set in the monitoring apparatus 2 is not performed with respect not to the notification command but to the control command, is described. A configuration of a monitoring system according to the present exemplary embodiment is similar to the configuration of the monitoring system 1 according to the first exemplary embodiment. In the present exemplary embodiment, a device type specifying functions of a device is used, Each of the monitoring apparatus 2, the detection devices 4a and 4b, and the operation devices 5a and 5b has the device type as one of attributes, Specific examples of the device type include an On/Off Power Switch type in which a device operates by on/off in binary, and a Sensor-Notification type in which a device notifies an occurred event. The former type is the device type of the operation devices 5a and 5b, and the latter type is the device type of the detection devices 4a and 4b.

Figure 8:
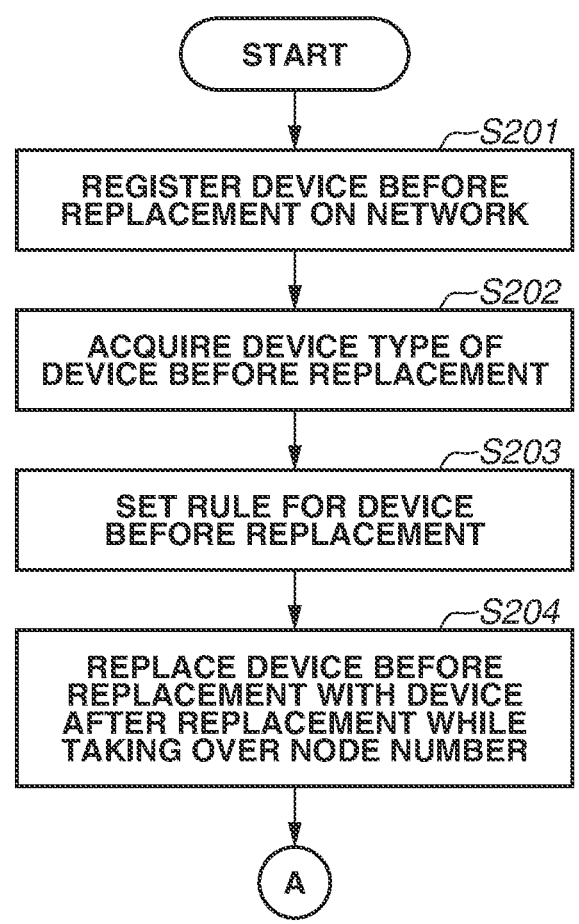
FIG. 8 is a flowchart illustrating processing by a monitoring apparatus according to one or more aspects of the present disclosure.
Figure 9:
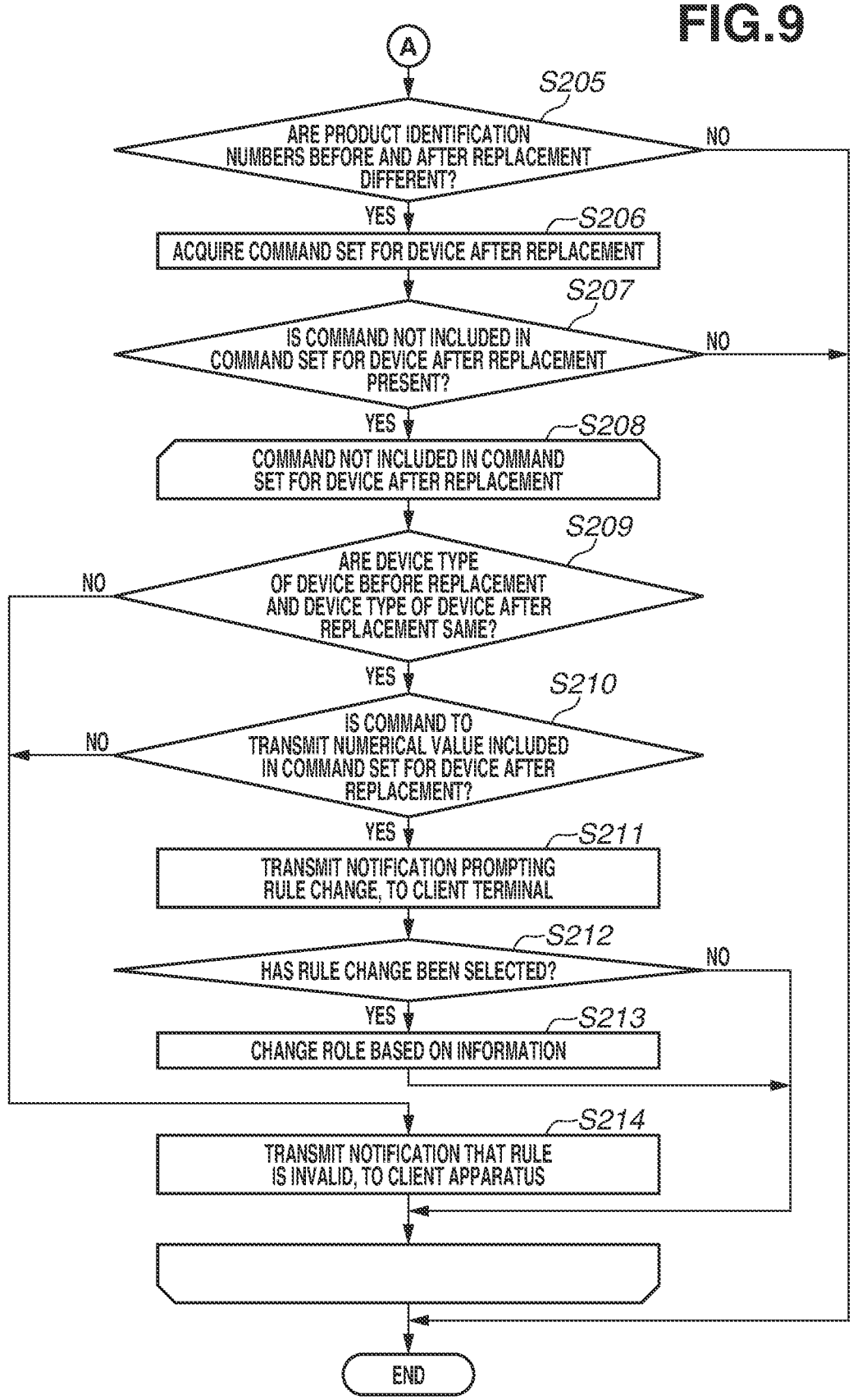
FIG. 9 is a flowchart illustrating processing by the monitoring apparatus according to one or more aspects of the present disclosure.

FIG. 8 and FIG. 9 are flowcharts illustrating processing by the monitoring apparatus 2 according to the present exemplary embodiment. The processing illustrated in FIG. 8 and FIG. 9 is realized when the control unit 11 and the setting control unit 13 of the monitoring apparatus 2 execute programs stored in the storage unit 12. In the following, the processing by the monitoring apparatus 2 in the case where the operation device 5a is replaced with the operation device 5b is described in detail with reference to FIGS. 10 to 12 in addition to FIG. 8 and FIG. 9. First, in step S201, the control unit 11 performs processing to register the operation device 5a that is a device before replacement, on the network 7.

More specifically, the control unit 11 transmits and receives a command to exchange various kinds of information necessary to register the operation device 5a as a device on the network 7, to/from the operation device 5a through the communication unit 14. The various kinds of necessary information include basic information to control the operation device 5a, such as information on commands usable for the operation device 5a, information to encrypt a communication path, setting information on an operation time of the operation device 5a, the node number, and the product identification number. The control unit 11 stores the information acquired in step S201 in the storage unit 12. As a result, registration of the operation device 5a is completed. In the following, description is continued by regarding the node number of the operation device 5a as "7".

Next, in step S202, the control unit 11 acquires information about the device type of the operation device 5a from the operation device 5a through the communication unit 14. The device type of the operation device 5a acquired at this time is the above-described On/Off Power Switch type. The control unit 11 stores the acquired information in the storage unit 12. Subsequently, in step S203, the setting control unit 13 receives contents of a rule to be set regarding the operation device 5a, from the client apparatus 3, and performs processing to set the rule in the storage unit 12. In a case where an event occurs, the control unit 11 thereafter performs the designated action based on the rule thus stored in the storage unit 12.

FIG. 10 is a diagram illustrating a display screen 24 for rule setting, displayed on the client apparatus 3 in step S203. The display screen 24 is displayed when the control unit of the client apparatus 3 executes a program stored in the storage unit of the client apparatus 3 in response to user input of a rule setting request to the client apparatus 3. The client apparatus 3 transmits contents of the rule set by the user in the display screen 24, to the monitoring apparatus 2. The display screen 24 is a screen displayed for setting of one of a plurality of rules settable to the monitoring apparatus 2. The display screen 24 in the example of FIG. 10 is a screen for setting of a rule identified by an identification number #2.

A selection list 241 to set an event, a selection list 242 to set an action to be performed when the event occurs, a save button 243, and a cancel button 244 are displayed on the display screen 24. The functions are similar to the selection list 211, the selection list 212, the save button 213, and the cancel button 214 in the display screen 21 of FIG. 5. In the display screen 24, however, options of the node number are not included in the selection list 241, and options of the node number representing a command transmission destination are included in the selection list 242. The user performs selection of each of the lists in the display screen 24 by operating the client apparatus 3. In FIG. 10, a time of 8:00 a.m. has been selected in the selection list 241. However, the type of event selectable in the selection list 241 is not particularly limited as long as the event is settable in the monitoring apparatus 2. Further, in the selection list 242, transmission of the above-described switch-on command (Binary Switch Set 0xFF) to the operation device having the node number 7 on the network 7 has been selected.

Referring back to FIG. 8, in step S204, processing to replace the operation device 5a with the operation device 5b is performed. The detail of the processing is similar to the processing in step S103 of FIG. 4. The information on the operation device 5b is finally stored in the storage unit 12. After the processing in step S204 ends, the control unit 11 performs processing to compare the product identification number of the operation device 5a and the product identification number of the operation device 5b stored in the storage unit 12 in step S205 as illustrated in FIG. 9. In a case where the product identification number of the operation device 5a and the product identification number of the operation device 5b are different from each other (YES in step S205), the processing proceeds to step S06, Otherwise (NO in step S205), the processing to register the operation device 5b is completed without performing processing in and after step S206. In step S206, the control unit 11 transmits and receives, to/from the operation device 5b, a command to exchange information on commands that can be transmitted and received to/from the operation device 5b, thereby acquiring a command set representing the commands that can be transmitted and received to/from the operation device 5b. The control unit 11 stores the acquired information on the command set in the storage unit 12. The control unit 11 may acquire the information on the command set from the operation device 5b in step S204.

Next, in step S207, the setting control unit 13 refers to the rule (set in step S203) stored in the storage unit 12, and determines whether each of one or more control commands set to actions for the node number "7" is included in the above-described command set. In a case where it is determined that a command not included in the above-described command set is present (YES in step S207), the setting control unit 13 performs processing in steps S209 to S214 on each of the one or more commands not included in the above-described command set in step S208. In contrast, in a case where it is determined that a command not included in the above-described command set is not present (NO in step S207), the processing to register the operation device 5b is completed without performing processing in and after step S208. In step S209, the setting control unit 13 acquires information about the device type of the operation device 5b from the operation device 5b through the communication unit 14, and compares the acquired device type with the device type of the operation device 5a (acquired in step S202) stored in the storage unit 12. In a case where it is determined that the device types are the same (YES in step S209), the processing proceeds to step S210. Otherwise (NO in step S209), the processing proceeds to step S214. Note that in a case where a version of the communication standard of the network 7 is different, the identification number of the device type may be different even though the operation device has a similar device type. Therefore, in a case where the device type is different but the version of the communication standard is different, the processing may proceed to step S210.

In step S210, the setting control unit 13 determines whether the command set acquired in step S206 includes a command to generally transmit a numerical value such as 0xFF (e.g., Basic Set command of Z-Wave, hereinafter, referred to as "numerical value transmission command"). For example, even if the operation device 5b does not support the above-described switch-on command, the switch-on command may be substituted by a Basic Set (Value=0xFF) command that is a kind of the numerical value transmission command. Therefore, in a case where the numerical value transmission command is included in the commands that can be transmitted and received to/from the operation device 5b (YES in step S210), the processing proceeds to step S211. Otherwise (NO in step S210), the processing proceeds to step S214. In step S211, the setting control unit 13 transmits notification prompting rule change (information to ask execution/non-execution of rule change) to the client apparatus 3.

FIG. 11 is a diagram illustrating a display screen 25 displayed on the client apparatus 3 having received the notification in step S211. The display screen 25 is displayed when the control unit of the client apparatus 3 having received the notification in step S211 executes a program stored in the storage unit of the client apparatus 3. FIG. 11 illustrates a case where the action of the rule setting #2 illustrated in FIG. 10 is a change object, and the Basic Set (Value=0xFF) command is presented as a substitution rifle. The display screen 25 includes a display area 251 to notify a rule unusable in the device after replacement, and a display area 252 to notify a substitution rule compatible with the unusable rule. A button 253 to determine to change the unusable rule to the substitution rule and a button 254 to determine not to change the setting are further displayed on the display screen 25. The functions thereof are similar to the display areas 221 and 222 and the buttons 223 and 224 in FIG. 6.

Referring back to FIG. 9, in step S212, the setting control unit 13 receives the information transmitted by the client apparatus 3 through the communication unit 14, and checks the contents to determine whether the user has selected change of the unusable rule to the substitution rule. In a case where it is determined that the user has selected the rule change (YES in step S212), the processing proceeds to step S213. In step S213, the setting control unit 13 changes the rule in the storage unit 12 based on the substitution rule. The processing then proceeds to a next command. In contrast, in a case where it is determined that the user has not selected the rule change (NO in step S212), the processing proceeds to a next command without performing processing in step S213. When the processing proceeds from step S209 or S210 to step S214, the setting control unit 13 transmits notification that the rule is invalid, to the client apparatus 3. The processing then proceeds to a next command.

Figure 12:
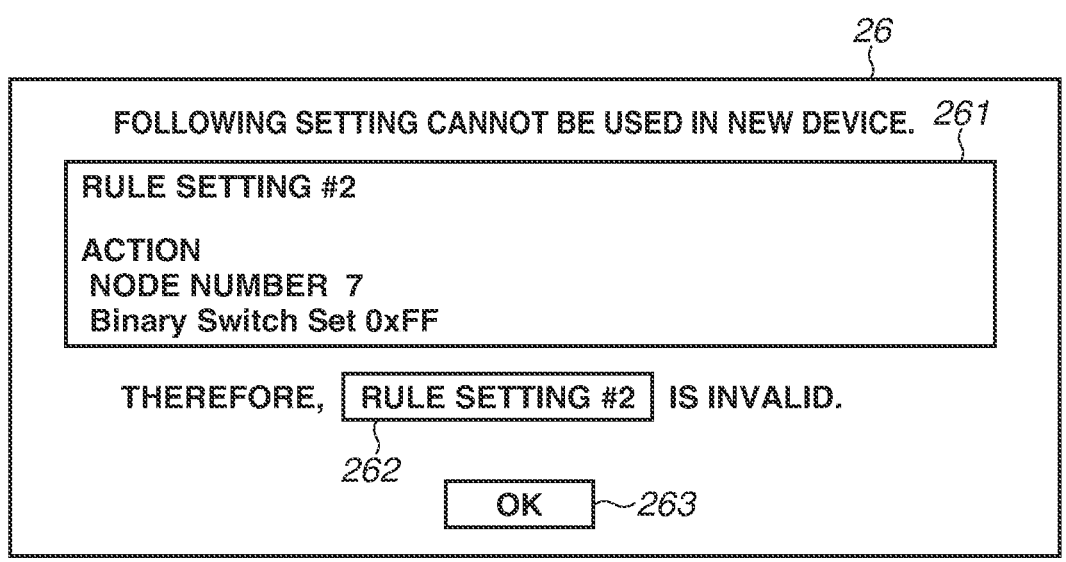
FIG. 12 is a diagram illustrating a display screen displayed on the client apparatus having received notification in step S211 illustrated in FIG. 9.

FIG. 12 is a diagram illustrating a display screen 26 displayed on the client apparatus 3 having received the notification in step S214. The display screen 26 is displayed when the control unit of the client apparatus 3 having received the notification in step S214 executes a program stored in the storage unit of the client apparatus 3. FIG. 12 illustrates a case where the rule setting #2 illustrated in FIG. 10 is invalid. The display screen 26 includes a display area 261 to notify the rule unusable in the device after replacement, a display area 262 to specify the invalid rule, and a button 263 to close the display screen 26. The user checks the invalid rule by viewing the display screen 26 displayed on the display unit of the client apparatus 3, and closes the display screen 26 by pressing the button 263.

As described above, according to the present exemplary embodiment, the monitoring apparatus 2 checks whether the operation device 5a and the operation device 5b are the same product when the operation device 5a is replaced with the operation device 5b. In a case where the operation device 5a and the operation device 5b are not the same product, the monitoring apparatus 2 checks whether the control command set to the action of the rule stored in the storage unit 12 can be transmitted to the operation device 5b. Thereafter, in a case where the control command set to the action of the rule cannot be transmitted, the monitoring apparatus 2 determines whether the device types of the operation devices 5a and 5b are the same (i.e., whether operation devices 5a and 5b have similar operation functions) and whether the numerical value transmission command can be transmitted to the operation device 5b. In a case where the device types are the same and the numerical value transmission command can be transmitted, the monitoring apparatus 2 transmits the notification prompting the rule change to the user. When the user selects the rule change, the monitoring apparatus 2 changes the rule. Accordingly, in the case where the operation device 5a is replaced with the operation device 5b, it is possible to prevent occurrence of a state where operation following the set in the monitoring apparatus 2 is not performed.

In the present exemplary embodiment, the example in which the display screen 25 is displayed for each of the rules has been described; however, a screen prompting selection for each of the plurality of rule settings may be displayed on one display screen 25. Likewise, in the above-described exemplary embodiment, the example in which the display screen 26 is displayed for each of the rules has been described; however, information about each of the plurality of rule settings may be displayed in one display screen 26.

Other Exemplary Embodiments

Although some exemplary embodiments of the present disclosure have been described in detail, the present disclosure is not limited to such specific exemplary embodiments, and can be modified or the like within the scope of the present disclosure. The above-described exemplary embodiments may be combined as needed. For example, a part or the whole of the functional configuration of the above-described monitoring system may be implemented as not software but hardware in the monitoring apparatus 2, the client apparatus 3, the detection devices 4a and 4b, and the operation devices 5a and 5b.

In the first exemplary embodiment, the example in which the command is used as the event for rule setting has been described; however, the present disclosure is applicable to the other types of rule setting. The present disclosure is applicable to any setting as long as the setting uses the command, for example, rule setting when the monitoring apparatus 2 receives a command from the detection device and transmits contents of the command to the client apparatus 3. In the second exemplary embodiment, the example in which the control command is substituted by the numerical value transmission command has been described; however, the rule change of the control command may be performed by a method similar to the method in the first exemplary embodiment.

Further, it may be determined whether software versions are different in addition to the product identification numbers in the processing in step S104 of FIG. 4 or in the processing in step S205 of FIG. 9, and in a case where the software versions are different, the processing may proceed to step S105 or S206. Further, it may be determined whether one or more of the manufacturer identification number, the product type, the device type, and a role type on the network are different between the device before replacement and the device after replacement in the processing in step S104 of FIG. 4 or in the processing in step S205 of FIG. 9, In a case where it is determined that one or more of the manufacturer identification number, the product type, the device type, and the role type on the network are different between the device before replacement and the device after replacement, the processing may end without performing processing in and after step S105 or S206. In the display screen 21 of FIG. 5 and the display screen 24 of FIG. 10, the command name is directly displayed; however, some of the commands have meaning difficult to understand. Therefore, in place of direct display of the command name, a display enabling the user to easily understand the meaning, for example, "node number 7, switch on" as the action of FIG. 10 may be performed.

In a case where a command in which a part of the command data is the same as the command data of the command used for setting and the other part of the command data is unknown is included in the commands that can be transmitted and received to/from the external device after replacement, the command may be added to the options in the display screen 22, 25, etc. Further, the configuration, the processing, etc. of each of the above-described exemplary embodiments may be applied to a computer, a service apparatus, etc. other than the monitoring apparatus 2, the client apparatus 3, the detection devices 4a and 4b, and the operation devices 5a and 5b.

Further, at least a part of the configuration of the monitoring apparatus 2 may be realized by hardware. In a case where at least a part of the configuration of the monitoring apparatus 2 is realized by hardware, for example, a dedicated circuit is automatically generated on a field programmable gate array (FPGA) from programs to realize the steps by using a predetermined complier. Further, a gate array circuit may be formed and realized as hardware as with the FPGA, Alternatively, at least a part of the configuration of the monitoring apparatus 2 may be realized by an application specific integrated circuit (ASIC). Further, the exemplary embodiments of the present disclosure are realized by supplying programs realizing the functions of the above-described exemplary embodiments to a system or an apparatus through a network or various kinds of recording media, and causing a computer (CPU microprocessor unit (MPU), etc.) of the system or the apparatus to read out and execute the programs. In this case, the programs and the recording medium storing the programs configure the present disclosure.

According to the above-described exemplary embodiments, in the case where the external device connected to the information processing apparatus is replaced, it is possible to prevent occurrence of the state where operation following the rule set in the information processing apparatus is not performed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-158798, filed Sep. 23, 2020, which is hereby incorporated by reference herein in its entirety.

What is claimed is:

1. An information processing apparatus, comprising a computer executing instructions which, when executed by the computer, cause the information processing apparatus to:
store setting that associates a node number assigned to a first external device with a first command transmittable and receivable to/from the first external device;
determine, in a case where the first command is not transmittable and receivable to/from a second external device that takes over the node number of the first external device, whether a second command compatible with the first command is transmittable and receivable to/from the second external device; and
perform, in a case where it is determines that the second command is transmittable and receivable to/from the second external device, control to change the first command in the setting to the second command,
wherein in a case where a product identification number is same between the first external device and the second external device, the control is not performed.

2. The information processing apparatus according to claim 1,
wherein the information processing apparatus is a monitoring apparatus,
wherein the setting is a rule associating a predetermined action by the monitoring apparatus with an event occurring in the monitoring apparatus, and
wherein the first command is set as the event or the action in the rule.

3. The information processing apparatus according to claim 1, wherein the instructions cause the information processing apparatus to, in the case where it is determined that the second command is transmittable and receivable to/from the second external device, transmit, to a client apparatus, information to ask a user whether to change the first command in the setting to the second command.

4. The information processing apparatus according to claim 3, wherein the instructions cause the information processing apparatus to, in response to reception of information representing determination that the first command in the setting is changed to the second command, from the client apparatus, perform processing to change the first command in the setting to the second command.

5. The information processing apparatus according to claim 1, wherein the instructions cause the information processing apparatus to, in a case where it is determined that the second command is not transmittable and receivable to/from the second external device, transmit information to notify a user that the setting is invalid, to a client apparatus.

6. The information processing apparatus according to claim 1, wherein, in a case where one or more of a manufacturer identification number, a product type, a device type, and a role type on a network are different between the first external device and the second external device, the control is not performed.

7. The information processing apparatus according to claim 1,
wherein the instructions cause the information processing apparatus to store a command correspondence table associating the first command with the second command, and
acquire the second command by referring to the command correspondence table.

8. The information processing apparatus according to claim 1, wherein the instructions cause the information processing apparatus to, in a case where a command in which a part of command data is same as command data of the first command and a remaining part of the command data is unknown is included in commands transmittable and receivable to/from the second external device, acquire the command as the second command.

9. The information processing apparatus according to claim 1, wherein the instructions cause the information processing apparatus to, in a case where a device type is same between the first external device and the second external device and a command transmitting a numerical value is included in commands transmittable and receivable to/from the second external device, acquire the command as the second command.

10. An information processing method, comprising:
determining, in a case where a first command transmittable and receivable to/from a first external device is not transmittable and receivable to/from a second external device that takes over a node number of the first external device, whether a second command compatible with the first command is transmittable and receivable to/from the second external device; and
performing, in a case where it is determined that the second command is transmittable and receivable to/from the second external device, control to change the first command in setting associating the node number assigned to the first external device with the first command, to the second command,
wherein in a case where a product identification number is same between the first external device and the second external device, the control is not performed.

11. A non-transitory computer-readable storage medium that stores a program for causing a computer to perform an information processing method, the information processing method comprising:
determining, in a case where a first command transmittable and receivable to/from a first external device is not transmittable and receivable to/from a second external device that takes over a node number of the first external device, whether a second command compatible with the first command is transmittable and receivable to/from the second external device; and
performing, in a case where it is determined that the second command is transmittable and receivable to/from the second external device, control to change the first command in setting associating the node number assigned to the first external device with the first command, to the second command,
wherein in a case where a product identification number is same between the first external device and the second external device, the control is not performed.

* * * * *